(12) United States Patent
Jung et al.

(10) Patent No.: US 11,496,348 B2
(45) Date of Patent: Nov. 8, 2022

(54) METHOD AND APPARATUS FOR RECEIVING WIRELESS SIGNAL IN WIRELESS COMMUNICATION SYSTEM

(71) Applicant: ELECTRONICS AND TELECOMMUNICATIONS RESEARCH INSTITUTE, Daejeon (KR)

(72) Inventors: Soo Yeob Jung, Sejong-si (KR); Pan Soo Kim, Daejeon (KR); Joon Gyu Ryu, Daejeon (KR); Gyeong Rae Im, Daejeon (KR); Dong Hyun Jung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 17/494,464

(22) Filed: Oct. 5, 2021

(65) Prior Publication Data
US 2022/0141073 A1     May 5, 2022

(30) Foreign Application Priority Data

Nov. 4, 2020   (KR) .................. 10-2020-0146392

(51) Int. Cl.
*H04L 27/26*   (2006.01)
(52) U.S. Cl.
CPC ...... *H04L 27/2651* (2021.01); *H04L 27/2657* (2013.01)

(58) Field of Classification Search
CPC .............. H04L 27/2657; H04L 27/265; H04L 27/2651; H04L 27/2659; H04B 1/70752; H04B 1/70754; H04B 1/7077
See application file for complete search history.

(56) References Cited

U.S. PATENT DOCUMENTS

| 6,363,049 | B1 | 3/2002 | Chung |
| 7,596,181 | B2 | 9/2009 | Chang et al. |
| 8,731,032 | B2* | 5/2014 | Kim ............ H04L 27/227 |
| | | | 342/174 |
| 10,097,312 | B2 | 10/2018 | Song et al. |
| 10,177,941 | B2 | 1/2019 | Oh et al. |
| 10,536,188 | B2 | 1/2020 | Kim et al. |

FOREIGN PATENT DOCUMENTS

WO    2017/135455 A1    8/2017

* cited by examiner

*Primary Examiner* — Rahel Guarino
(74) *Attorney, Agent, or Firm* — Rabin & Berdo, P.C.

(57) ABSTRACT

A method for receiving a wireless signal, performed by a first communication node, may comprise: storing a wireless signal received by the first communication node as samples in a buffer; performing partial correlation operations on the stored samples by a plurality of partial correlators; performing a first FFT operation on results of the partial correlation operations; performing a cumulative product operation on results of the first FFT operation; performing a second FFT operation based on a result of the cumulative product operation; and performing synchronization estimation based on the results of the first FFT operation and a result of the second FFT operation.

13 Claims, 5 Drawing Sheets

METHOD AND APPARATUS FOR RECEIVING WIRELESS SIGNAL IN WIRELESS COMMUNICATION SYSTEM

CROSS-REFERENCE TO RELATED APPLICATIONS

This application claims priority to Korean Patent Applications No. 10-2020-0146392, filed on Nov. 4, 2020, with the Korean Intellectual Property Office (KIPO), the entire contents of which are hereby incorporated by reference.

BACKGROUND

1. Technical Field

The present disclosure relates to a method and an apparatus for receiving data in a wireless communication system, and more particularly, to a data reception method which has low complexity and is robust against interference between data that may occur in a situation of receiving the data from a plurality of transmitting nodes, and an apparatus therefor.

2. Related Art

Internet of things (IoT) technology connects various things through the Internet, enables the connected things to exchange information with each other, and provides services, which can inquire information on the things or remotely control the things, to users. The things connected through the Internet may be things in the real world (e.g., temperature sensors, humidity sensors, lights, smartphones, etc.), or virtual things (e.g., SMS services, user recognition services, advertisements, etc.) existing on the Internet. In particular, services for inquiring information on the things or controlling the things by using the conventional world wide web (WWW) technology may be called web-based Internet of things services or web of things (WoT) services.

A communication system supporting the IoT (hereinafter, 'IoT communication system') may provide various user services by using information and functions of connected devices. The IoT communication system may be connected to various things through the Internet. The IoT communication system may be a wireless communication system based on a wireless personal access network (WPAN), wireless body area network (WBAN), wireless broadband internet (WiBro), long range wide-area network (LoRaWan), world interoperability for microwave access (WiMax), and/or wireless fidelity (Wi-Fi).

The IoT communication system may be implemented in various schemes. For example, the communication system may include a plurality of IoT terminals. The IoT terminals may perform sensing operations as sensor nodes. The IoT terminals may be connected to a relay node such as a low-orbit satellite to transmit sensing data, and the sensing data transmitted to the relay node may be transmitted to and utilized by a terrestrial base station. Here, in the relay node that simultaneously receives data transmitted from the plurality of communication nodes, there may occur a problem that interference between the data may occur and the reception performance may deteriorate.

Matters described as the prior arts are prepared to promote understanding of the background of the present disclosure, and may include matters that are not already known to those of ordinary skill in the technology domain to which exemplary embodiments of the present disclosure belong.

SUMMARY

In order to solve the above-identified problems, exemplary embodiments of the present disclosure are directed to providing a data reception method which has low complexity and is robust against interference between data that may occur in a situation of receiving the data from a plurality of transmitting nodes, and an apparatus therefor.

According to an exemplary embodiment of the present disclosure for achieving the above-described objective, a method for receiving a wireless signal, performed by a first communication node, may comprise: storing a wireless signal received by the first communication node as samples in a buffer; performing partial correlation operations on the stored samples by a plurality of partial correlators; performing a first Fast Fourier Transform (FFT) operation on results of the partial correlation operations; performing a cumulative product operation on results of the first FFT operation; performing a second FFT operation based on a result of the cumulative product operation; and performing synchronization estimation based on the results of the first FFT operation and a result of the second FFT operation.

The performing of the cumulative product operation may comprise: collecting the results of the first FFT operation by a first length; and generating a two-dimensional matrix based on the collected results of the first FFT operation.

The two-dimensional matrix may have as many columns as a length of the first FFT operation and as many rows as a length of a synchronization header (SHR).

The performing of the cumulative product operation may comprise: generating a plurality of temporary vectors based on a plurality of first FFT result vectors generated according to the first FFT operation; performing a conjugate operation on an (n−1)-th temporary vector among the plurality of temporary vectors; generating a product term by multiplying an n-th temporary vector among the plurality of temporary vectors and a result of the conjugation operation; and adding a plurality of the product terms.

The performing of the cumulative product operation may comprise: configuring a first searching range based on the results of the first FFT operation; and performing the cumulative product operation on components corresponding to the first searching range among the results of the first FFT operation.

The performing of the second FFT operation may comprise: identifying a range having a largest cumulative value as a result of the cumulative product operation; configuring a second searching range including a range having a largest accumulated value; and performing the second FFT operation on components corresponding to the second searching range.

The performing of the synchronization estimation comprises estimating a carrier frequency offset (CFO) based on a maximum value in the first FFT operation, a size of the first FFT operation, a length of the partial correlation operation, a maximum value in the second FFT operation, and a size of the second FFT operation.

According to another exemplary embodiment of the present disclosure for achieving the above-described objective, a first communication node receiving a wireless signal in a communication system may comprise: a processor; a plurality of partial correlators; a memory electronically communicating with the processor; and instructions stored in the memory, wherein when executed by the processor, the instructions cause the first communication node to: store a wireless signal received by the first communication node as samples in a buffer; perform partial correlation operations on the stored samples by the plurality of partial correlators; perform a first FFT operation on results of the partial correlation operations; perform a cumulative product operation on results of the first FFT operation; perform a second FFT operation based on a result of the cumulative product operation; and perform synchronization estimation based on the results of the first FFT operation and a result of the second FFT operation.

The instructions may further cause the first communication node to: collect the results of the first FFT operation by a first length; and generate a two-dimensional matrix based on the collected results of the first FFT operation.

The instructions may further cause the first communication node to: generate a plurality of temporary vectors based on a plurality of first FFT result vectors generated according to the first FFT operation; perform a conjugate operation on an (n−1)-th temporary vector among the plurality of temporary vectors; generate a product term by multiplying an n-th temporary vector among the plurality of temporary vectors and a result of the conjugation operation; and add a plurality of the product terms.

The instructions may further cause the first communication node to: configure a first searching range based on the results of the first FFT operation; and perform the cumulative product operation on components corresponding to the first searching range among the results of the first FFT operation.

The instructions may further cause the first communication node to: identify a range having a largest cumulative value as a result of the cumulative product operation; configure a second searching range including a range having a largest accumulated value; and perform the second FFT operation on components corresponding to the second searching range.

The instructions may further cause the first communication node to estimate a carrier frequency offset (CFO) based on a maximum value in the first FFT operation, a size of the first FFT operation, a length of the partial correlation operation, a maximum value in the second FFT operation, and a size of the second FFT operation.

According to the exemplary embodiments of the present disclosure, the receiver included in the communication node of the communication system may effectively perform a wireless signal detection operation through prior partial correlation operations using a plurality of partial correlators, a first FFT operation, a cumulative product operation, a second FFT operation, and the like. In addition, according to the exemplary embodiments of the present disclosure, the receiver included in the communication node of the communication system may perform a wireless signal detection operation that is robust against interference between data that may occur in a situation of receiving the data transmitted from a plurality of communication nodes, and has low complexity.

DETAILED DESCRIPTION OF THE EMBODIMENTS

Figure 1:
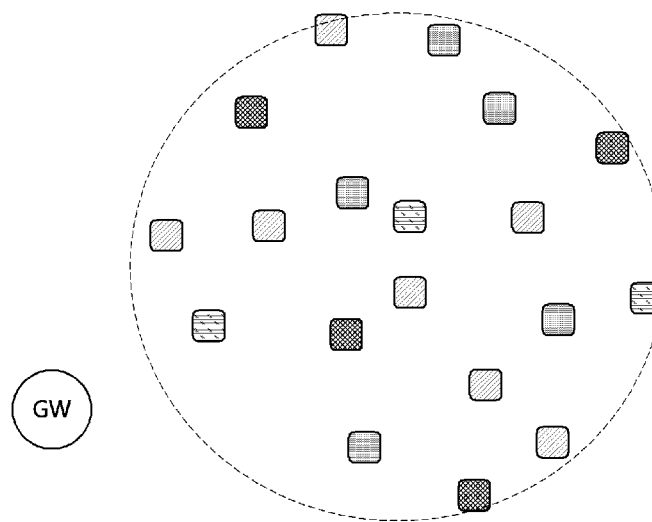
FIG. 1 is a conceptual diagram illustrating an exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one A or B" or "at least one of one or more combinations of A and B". In addition, "one or more of A and B" may refer to "one or more of A or B" or "one or more of one or more combinations of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the present specification, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSUPA), 4G mobile communication network such as a long term evolution (LTE) network or an LTE-Advanced network, 5G mobile communication network, or the like.

Throughout the present specification, a terminal may refer to a mobile station, mobile terminal, subscriber station, portable subscriber station, user equipment, an access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present specification, the base station may refer to an access point, radio access station, node B, evolved node B (eNodeB), base transceiver station, mobile multihop relay (MMR)-BS, or the like, and may include all or part of functions of the base station, access point, radio access station, nodeB, eNodeB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating an exemplary embodiment of a communication system.

Referring to FIG. 1, a communication system may include a plurality of communication nodes and a relay node that receives and relays signals from the plurality of communication nodes. The relay node may be a gateway (GW). The relay node may refer to a communication satellite, low-orbit communication satellite, access point, radio access station, node B, evolved nodeB (eNB), base transceiver station, mobile multihop relay (MMR)-BS, coordinator, or the like. Alternatively, the relay node may include all or part of functions of the base station, access point, radio access station, nodeB, eNB, transceiver base station, MMR-BS, and/or coordinator.

The communication node may refer to a mobile station, mobile terminal, subscriber station, portable subscriber station, user equipment, access terminal, end-device, and/or the like, and may include all or part of functions of the terminal, mobile station, mobile terminal, subscriber station, portable subscriber station, user device, access terminal, and/or the like. Here, the communication nodes may include a sensor attached to the thing and having communication capability. The sensors having communication capability may be referred to as sensor nodes. The sensor nodes attached to things may be used to implement the Internet of Things (IoT).

Each of the communication nodes may be a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability. Meanwhile, each of the plurality of communication nodes may have the following structure.

Figure 2:
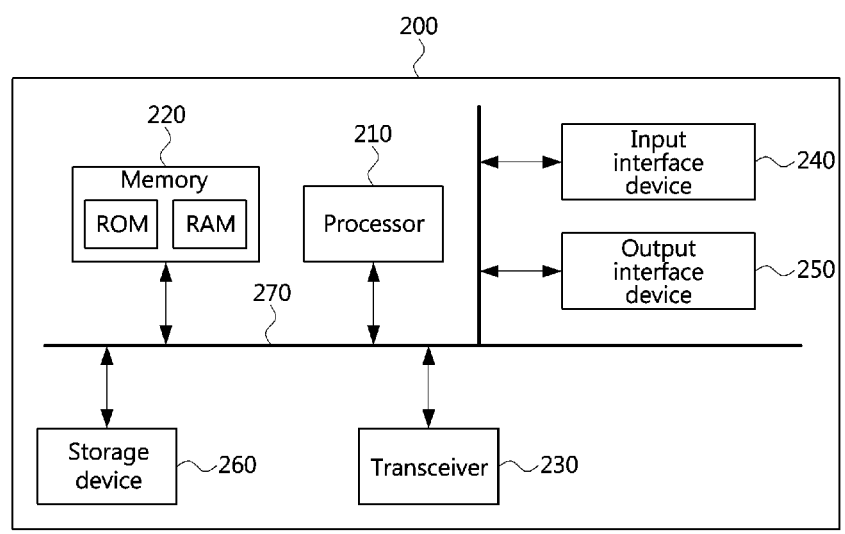
FIG. 2 is a block diagram illustrating an exemplary embodiment of a communication node constituting a communication system.

FIG. 2 is a block diagram illustrating an exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270. However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system may include the relay node and the plurality of communication nodes. Communication between the relay node and the communication nodes may be performed by a full-duplex scheme. In the case of the full-duplex scheme, since each of the relay node and the communication nodes can transmit and receive data in both directions at the same time, the communication speed can be improved.

The plurality of communication nodes may support code a division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, filtered OFDM based communication protocol, orthogonal frequency division multiple access (OFDMA) based communication protocol, non-orthogonal multiple access (NOMA) based communication protocol, generalized frequency division multiplexing (GFDM) based communication protocol, filter band multi-carrier (FBMC) based communication protocol, universal filtered multi-carrier (UFMC) based communication protocol, space division multiple access (SDMA) based communication protocol, and/or the like.

As one example, the communication system may be a WPAN-based wireless communication system. However, exemplary embodiments of the present disclosure are not limited thereto. For example, the communication system may be a wireless communication system based on a wireless body area network (WBAN), wireless broadband internet (WiBro), Long Range Wide-Area Network (LoRaWAN), world interoperability for microwave access (WiMax), Sigfox, wireless fidelity (Wi-Fi), and/or the like. Alternatively, the communication system may be a wireless communication system based on Bluetooth low energy (BLE), ZigBee, Z-Wave, near field communication (NFC), radio frequency identification (RFID), and/or the like.

Hereinafter, Internet of Things (e.g., narrow band (NB)-IoT) communication technologies will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a transmitting terminal is described, a corresponding receiving terminal may perform an operation corresponding to the operation of the transmitting terminal. Conversely, when an operation of a receiving terminal is described, a corresponding transmitting terminal may perform an operation corresponding to the operation of the receiving terminal.

The early IoT communications started with sensor and radio frequency identification (RFID) networks that mainly target local areas, but as the purposes and characteristics of applications gradually diversify, they are being implemented through various wired/wireless networks. In particular, considering services for mobile IoT devices, service support in a wide range of areas including islands, mountains and oceans, limitation of costs for network introduction and operation, ease of network maintenance, security for reliable data transmission, and service quality assurance, the need for developing an IoT communication system based on the conventionally built mobile communication network is growing.

The IoT communication system has characteristics different from those of the conventional human user-centered mobile communication system. As an example, an IoT device (also referred to as a 'terminal') may transmit/receive very small data intermittently (also, according to a short-periodicity if necessary), and it may not be easy to supply power, so it may need to support ultra-low power operation. Also, depending on the IoT device, support for mobility may be required, or it may be used fixedly attached to a specific place.

The IoT device may require mobility support and may be used fixedly depending on a situation. In addition, a large number of IoT devices may be connected to the IoT communication network at the same time. As typical examples of the IoT devices, smart meters, vending machines, or the like equipped with mobile communication modules have been considered, and recently, a form of a device, which can be automatically connect to the network according to an installed location and a usage environment without user manipulation or intervention, is also considered as a form of performing communication.

Due to such the characteristics, research on the construction of the IoT communication network using the conventional mobile communication system is active, and in particular, NB-IoT, an IoT communication system using the 3GPP LTE communication system, which is the most applied mobile communication system worldwide, is attracting a lot of attention. The NB-IoT supports three operation modes: in-band, guard-band, and stand-alone, and the same requirements are applied thereto. The NB-IoT in the in-band mode may be operated by allocating some of resources within an LTE band to the NB-IoT, and the NB-IoT in the guard-band mode may utilize a guard frequency band of the LTE, and NB-IoT carrier may be arranged as close as possible to edge subcarriers of the LTE. The NB-IoT in the stand-alone mode may be operated by separately allocating some carriers within the global system for mobile communications (GSM) band.

Meanwhile, as an IoT communication network technology for using IoT devices requiring low-power operation in a wide area, a low-power wide-area (LPWA) communication technology is being studied. The LPWA communication technology may use a wireless transceiver technology capable of long-distance communication while consuming low power as its core. The LPWA communication technology may be applied to various IoT services such as urban underground facility monitoring and management systems, unmanned meters, intelligent transportation services, and real-time monitoring. In the field of the LPWA communication technology, a smart utility network (SUN) technology or a low energy critical infrastructure monitoring (LECIM) network technology is being studied. For example, the LECIM network technology may refer to a network technology that connects sensor devices located on the ground, underground, underwater, inside a building, etc., which are distributed over a wide area. Such the sensor devices may be located in a place where maintenance is difficult after installation, and may have to operate for a long time (e.g., more than several years) with an independent power source such as a battery. In addition, the sensor devices may need to be able to transmit data periodically under a radio environment with many changes or from time to time when a specific situation occurs.

Communication nodes in the IoT communication system may be configured as sensors attached to objects and capable of communication. Such the sensors having communication capability may be referred to as sensor nodes. The sensor nodes may be miniature IoT sensor devices. The sensor nodes may collect data by performing sensing operations. Alternatively, the sensor nodes may perform the sensing operations to generate and transmit sensing data. The sensor nodes may form a wireless sensor networks (WSN).

In an exemplary embodiment, each of the communication nodes to which the IoT communication technology is applied may directly communicate with a relay node. For example, each of the communication nodes may be a sensor node, and each of the sensor nodes may directly communicate with the relay node to transmit sensing data. Alternatively, each of the sensor nodes may receive a signal including an instruction related to the sensing operation directly from the relay node. In another exemplary embodiment, the communication nodes to which the IoT communication technology is applied may form a cluster. One communication node among the communication nodes constituting the cluster may be a cluster head (CH), and other communication nodes may be cluster members. The cluster head may be connected to the relay node and the cluster members. In a wireless communication network where a large number of devices are connected, a transmission path selection algorithm may be used or a cluster may be formed to avoid a hot spot where traffic is concentrated. By performing data transmission based on the cluster structure configured as described above, it is possible to prevent a large number of wireless communication connections from being established with the relay node or gateway (or sink node). In the cluster-based routing protocol, communication nodes within the network may be grouped to form several clusters, each cluster may maintain one cluster head (CH) capable of communicating with the relay node or gateway, and the remaining communication nodes may form a hierarchical network structure as cluster members (CMs). The cluster head may receive data from the cluster members. The communication system may include a plurality of clusters, and cluster heads included in the respective clusters may collect the data received from the cluster members and transmit the collected data to the relay node or gateway.

The sensor nodes constituting the IoT communication system may be configured as various types of sensor devices. For example, the sensor node may be a positioning sensor node. The positioning sensor node may be utilized to identify a position of a cargo or container to be tracked in the communication system. Alternatively, the sensor node may be a water quantity sensor node. The water quantity sensor node may be used to identify a water quantity of a water tank or dam to be managed in the communication system. Alternatively, the sensor nodes may be a plurality of sensor nodes that are randomly distributed on a large scale in a large area for forest fire prevention and response. In this case, the sensor nodes may include wind speed sensor nodes, $CO_2$ sensor nodes, humidity sensor nodes, temperature sensor nodes, wind direction sensor nodes, and the like. Such the sensor nodes may be distributed and operated for forest fire services such as forest fire prediction, forest fire progress direction detection, and residual fire detection in environments such as mountains where human access is difficult. Although the IoT communication system composed of various types of sensor devices has been described, this is only an example for convenience of description, and exemplary embodiments of the present disclosure are not limited thereto.

In an exemplary embodiment, sensor nodes to which the IoT technology is applied may be connected to a relay node such as a low-orbit satellite to transmit sensing data, and the transmitted sensing data may be transmitted to and utilized by a terrestrial base station or the like. The sensor nodes may be distributed over a wide area, and may transmit sensing data generated based on sensing operations performed in each area to a low-orbit satellite. After installation, the sensor nodes may have to operate for a long time with an independent power source such as a battery without maintenance and separate power supply. In addition, the sensor nodes may need to be able to transmit data periodically under a radio environment with many changes or from time to time when a specific situation occurs. In addition, in order to transmit data from the ground to a low-orbit satellite, it may be necessary to enable long-distance data transmission. Such the operations of the sensor nodes may be performed based on the LPWA communication technology. For example, the sensor nodes may transmit sensing data to a low-orbit satellite in form of low-speed data. Alternatively, the sensor nodes may transmit sensing data to a low-orbit satellite in form of burst data. The low-orbit satellite may receive and demodulate the sensing data transmitted from the sensor nodes. The low-orbit satellite may transmit the demodulated data to a terrestrial base station. The terrestrial base station may receive, collect, and utilize the data transmitted from the low-orbit satellites. In an exemplary embodiment, a situation in which the sensor nodes are connected to a low-orbit satellite and transmit sensing data to the low-orbit satellite has been described as an example, but this is only an example for description, and exemplary embodiments of the present disclosure are not limited thereto. That is, the relay node, which receives sensing data from the sensor nodes, and transmits the sensing data to the terrestrial base station, may be implemented in various forms other than the low-orbit satellite.

In the IoT communication system, the relay node may receive, process, and transmit data transmitted from a plurality of communication nodes. Here, in the relay node that simultaneously receives data transmitted from the plurality of communication nodes, there may be a problem that interference between the data may occur and the reception performance thereof may deteriorate. In particular, as the number of communication nodes constituting the IoT communication system increases, the possibility of interference occurring when the relay node receives the data may increase. In order to solve the above-described problems, the present disclosure proposes a method and an apparatus for receiving data with low complexity while reducing the influence of inter-data interference in receiving multiple data transmitted from a plurality of transmitting nodes.

Figure 3:
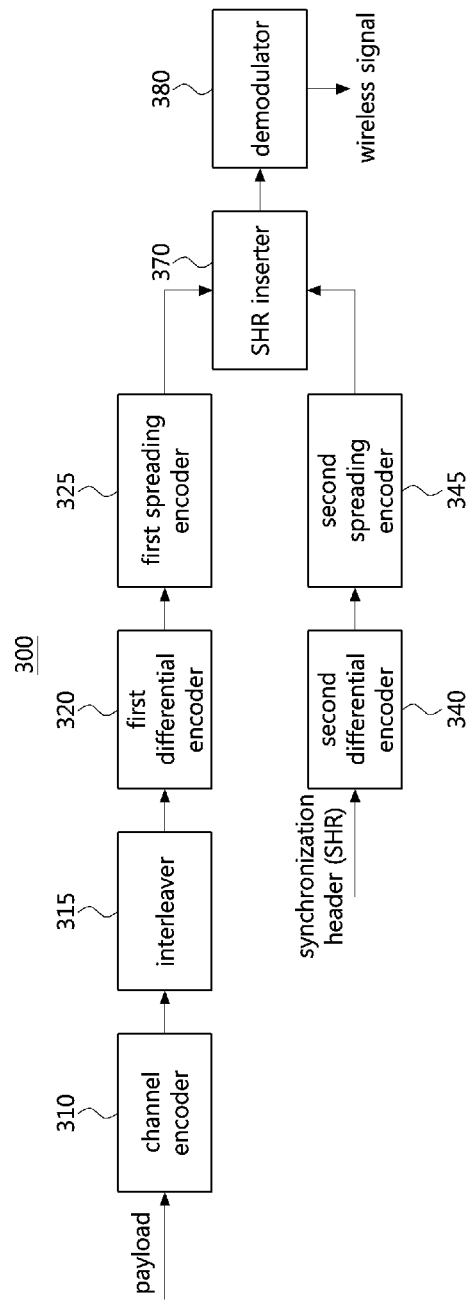
FIG. 3 is a block diagram illustrating an exemplary embodiment of a transmitter included in a communication node of a communication system.

FIG. 3 is a block diagram illustrating an exemplary embodiment of a transmitter included in a communication node of a communication system.

Referring to FIG. 3, a communication node of a communication system may include a transmitter 300 for transmitting a signal. The transmitter 300 may include a channel encoder 310, an interleaver 315, a first differential encoder 320, a first spreading encoder 325, a second differential encoder 340, a second spreading encoder 345, a synchronization header (SHR) inserter 370, and a modulator 380.

Information that the communication node intends to transmit through the transmitter 300 may be referred to as a payload. When the payload is input to the transmitter 300, the channel encoder 310 may perform channel coding. The channel coding may refer to an operation of converting a signal so that a receiver can detect and correct errors by using the converted signal when the information is transmitted to the receiver through a wireless channel. In an exemplary embodiment, the channel encoder 310 may perform the channel coding operation based on a convolutional coding scheme. The data encoded by the channel encoder 310 may be input to the interleaver 315. The interleaver 315 may perform an interleaving operation on the data input from the channel encoder 310. The interleaving may refer to an operation of dispersing bit errors in time or frequency so that the bit errors in a wireless channel environment where problems such as fading or burst errors are easy to occur are not concentrated in time or frequency. The interleaver 315 may input the interleaved data to the first differential encoder 320. The first differential encoder 320 may perform differential coding on the data input from the interleaver 315. The differential encoding operation may refer to an operation of obtaining coded values in the current order through a modulo-2 operation between raw data of the current order and coded values obtained in the previous order. The first differential encoder 320 may input the differentially-encoded data to the first spreading encoder 325.

The first spreading encoder 325 may perform spread coding or spread-spectrum coding on the data input from the first differential encoder 320. The spread coding may refer to an operation of encoding the data based on a preconfigured spread coding scheme or spreading factor so that the bandwidth (i.e., spectral bandwidth) of the data transmitted through the transmitter 300 is widened. The wireless signal encoded and transmitted according to the spread coding scheme may have characteristics of high security and robustness against fading. The first spreading encoder 325 may perform the spread coding based on at least one spread coding scheme. For example, the first spreading encoder 325 may perform the spread coding by using a Gold code scheme. The Gold code scheme has advantages in that the correlation between the encoded codes or codewords is relatively low and the types of codes are relatively diverse, and thus data transmission/reception quality can be improved. Alternatively, the first spreading encoder 325 may perform the spread coding by using an orthogonal variable spreading factor (OVSF) code scheme. The OVSF code scheme may be defined as a recursive scheme. For example, each codeword may undergo operations based on two branches. The two branches may include an upper branch and a lower branch, and in each branch, a codeword having twice the length of the input codeword (i.e., mother code) may be generated. The codeword generated in the upper branch may be generated by repeating the mother code twice. On the other hand, the codeword generated in the lower branch may be generated including a part identical to the mother code and a part obtained by inverting the mother code. The OVSF code scheme may ensure orthogonality between child codes of the same stage except for a relationship between the mother code and the child code.

The first spreading encoder 325 may perform spread coding according to the Gold code scheme on the data input from the first differential encoder 320. Alternatively, the first spreading encoder 325 may perform spread coding according to the OVSF code scheme on the data input from the first differential encoder 320. Alternatively, the first spreading encoder 325 may perform both the spread coding according to the Gold code scheme and the spread coding according to the OVSF code scheme on the data input from the first differential encoder 320. Alternatively, the first spreading encoder 325 may perform spread coding on the data input from the first differential encoder 320 based on various other spread coding schemes.

On the other hand, when the communication node desires to transmit the payload through the transmitter 300, a synchronization header (SHR) may be transmitted together so that the receiving end can easily check synchronization and restore the payload. The SHR may be configured to include a preamble field and a Start-of-Frame Delimiter (SFD) field. The preamble field may be used to synchronize transmission timing between the transmitter 300 transmitting the signal and the receiving end receiving the same. The SFD field may indicate an ending point of the preamble and a starting point of a frame.

When the SHR is input to the transmitter 300, the second differential encoder 340 may perform differential encoding on the input SHR. The second differential encoder 340 may input the differentially-encoded data to the seconding spread encoder 345. The second spreading encoder 345 may perform spread coding or spread-spectrum coding on the data input from the second differential encoder 340. The length of the codeword subjected to the spread coding may increase according to the size of the spreading factor (SF). For example, the second spreading encoder 345 may perform spread coding according to the Gold code scheme on the data input from the second differential encoder 340. Alternatively, the second spreading encoder 345 may perform spread coding according to the OVSF code scheme on the data input from the second differential encoder 340. Alternatively, the second spreading encoder 345 may perform both the spread coding according to the Gold code scheme and the spread coding according to the OVSF code scheme on the data input from the second differential encoder 340. Alternatively, the second spreading encoder 345 may perform the spread coding on the data input from the second differential encoder 340 based on various spread coding schemes.

The data output from the first spreading encoder 325 and the data output from the second spreading encoder 345 may be input to the SHR inserter 370. The SHR inserter 370 may concatenate the payload coded through the channel encoder 310, the interleaver 315, the first differential encoder 320, and the first spreading encoder 325 with the SHR coded through the second differential encoder 340 and the second spreading encoder 345. Specifically, the SHR inserter 370 may output one concatenated data by inserting the code of the SHR before the code of the payload.

The data output from the SHR inserter 370 may be input to the modulator 380. The modulator may perform a modulation operation to transmit the encoded data through a wireless channel. In an exemplary embodiment, the modulator 380 may perform the modulation operation according to a binary phase shift keying (BPSK) scheme. However, this is only an example for description, and exemplary embodiments of the present disclosure are not limited thereto. The data modulated by the modulator 380 may be transmitted in form of a wireless signal.

In an exemplary embodiment, a sensing node such as an IoT sensing device included in the communication system may generate sensing data by performing a sensing operation. The sensing node may desire to transmit a payload including the sensing data to a relay node such as a low-orbit satellite. To this end, the sensing node may input the payload and the SHR to the transmitter 300 of the sensing node. The payload input to the transmitter 300 may be encoded through the channel encoder 310, the interleaver 315, the first differential encoder 320, and the first spreading encoder 325, and the SHR input to the transmitter 300 may be encoded through the second differential encoder 340 and the second spreading encoder 345. The encoded SHR and payload may be concatenated with each other, modulated together, and transmitted in form of a wireless signal. The wireless signal transmitted from the transmitter 300 as including the sensing data and the SHR may be received by a receiver included in the relay node.

Figure 4:
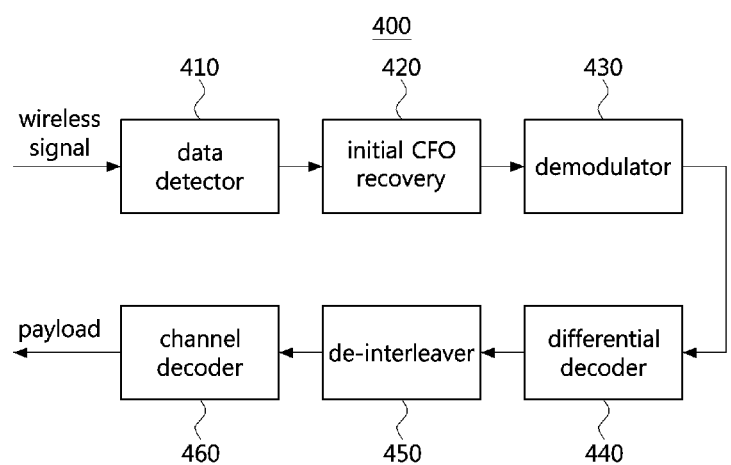
FIG. 4 is a block diagram illustrating an exemplary embodiment of a receiver included in a communication node of a communication system.

FIG. 4 is a block diagram illustrating an exemplary embodiment of a receiver included in a communication node of a communication system.

Referring to FIG. 4, a relay node of a communication system may include a receiver 400 for receiving radio signals transmitted from other communication nodes constituting the communication system. The receiver 400 may include a signal detector 410, an initial carrier frequency offset (CFO) recovery 420, a demodulator 430, a differential decoder 440, a de-interleaver 450, a channel decoder 460, and the like.

The signal detector 410 may perform a detection operation on a wireless signal received from another communication node. The received wireless signal may be the same as or similar to the wireless signal transmitted by the transmitter 300 described with reference to FIG. 3. The signal detector 410 may synchronize with the transmitter that has transmitted the wireless signal based on the received wireless signal. For example, the signal detector 410 may determine a CFO or a synchronization timing based on a portion corresponding to the SHR in the received wireless signal. A detailed operation method of the signal detector 410 will be described with reference to FIGS. 5 and 6.

When the signal detector 410 detects the wireless signal and identifies the CFO, the initial CFO recovery 420 may perform a CFO recovery operation based on the identified CFO. The initial CFO recovery 420 may identify an initial frequency used when the transmitting end transmits the data.

The receiver 400 may perform a payload restoration operation based on the identified synchronization timing or the identified initial frequency. The demodulator 430 included in the receiver 400 may perform a demodulation operation on a portion corresponding to the payload of the received wireless signal. The demodulation operation of the demodulator 430 may correspond to the modulation operation of the modulator 380 described with reference to FIG. 3. For example, the demodulator 430 may perform the demodulation operation according to the BPSK scheme. The differential decoder 440 may perform a decoding operation on the data demodulated by the demodulator 430. The decoding operation of the differential decoder 440 may correspond to the differential encoding operation of the first differential encoder 320 described with reference to FIG. 3. For example, the decoding operation of the differential decoder 440 may be a reverse operation of the differential encoding operation of the first differential encoder 320 described with reference to FIG. 3. The data decoded by the differential decoder 440 may be input to the de-interleaver 450. The de-interleaver 450 may perform a de-interleaving operation. The de-interleaving operation in the de-interleaver 450 may correspond to the interleaving operation in the interleaver 315 described with reference to FIG. 3. For example, the de-interleaving operation in the de-interleaver 450 may be a reverse operation of the interleaving operation in the interleaver 315 described with reference to FIG. 3. The data that has undergone the de-interleaving in the de-interleaver 450 may be input to the channel decoder 460. The channel decoder 460 may perform a channel decoding operation. The channel decoding operation in the channel decoder 460 may correspond to the channel encoding operation in the channel encoder 310 described with reference to FIG. 3. For example, the channel decoding operation in the channel decoder 460 may be a reverse operation of the channel coding operation in the channel encoder 310 described with reference to FIG. 3. The data that has undergone the channel decoding by the channel decoder 460 may be the same as the payload intended to be transmitted by the transmitter 300 described with reference to FIG. 3.

In an exemplary embodiment, a sensing node such as an IoT sensing device included in the communication system may transmit, to a relay node such as a low-orbit satellite, a wireless signal encoded and modulated from a payload including sensing data and an SHR. The receiver 400 of the relay node may receive the transmitted wireless signal. The receiver 400 may identify a synchronization timing and an initial frequency based on the operations of the signal detector 410 and the initial CFO recovery 420. The receiver 400 may perform a payload restoration operation based on the identified synchronization timing or the identified initial frequency. The payload restored through the demodulator 430, the differential decoder 440, the de-interleaver 450, and the channel decoder 460 may include the sensing data intended by the sensing node to transmit. The relay node may store the sensing data included in the payload in a storage device or transmit it to a separate server. The sensing data included in the payload may be utilized by being transmitted from the relay node to a terrestrial base station.

Figure 5:
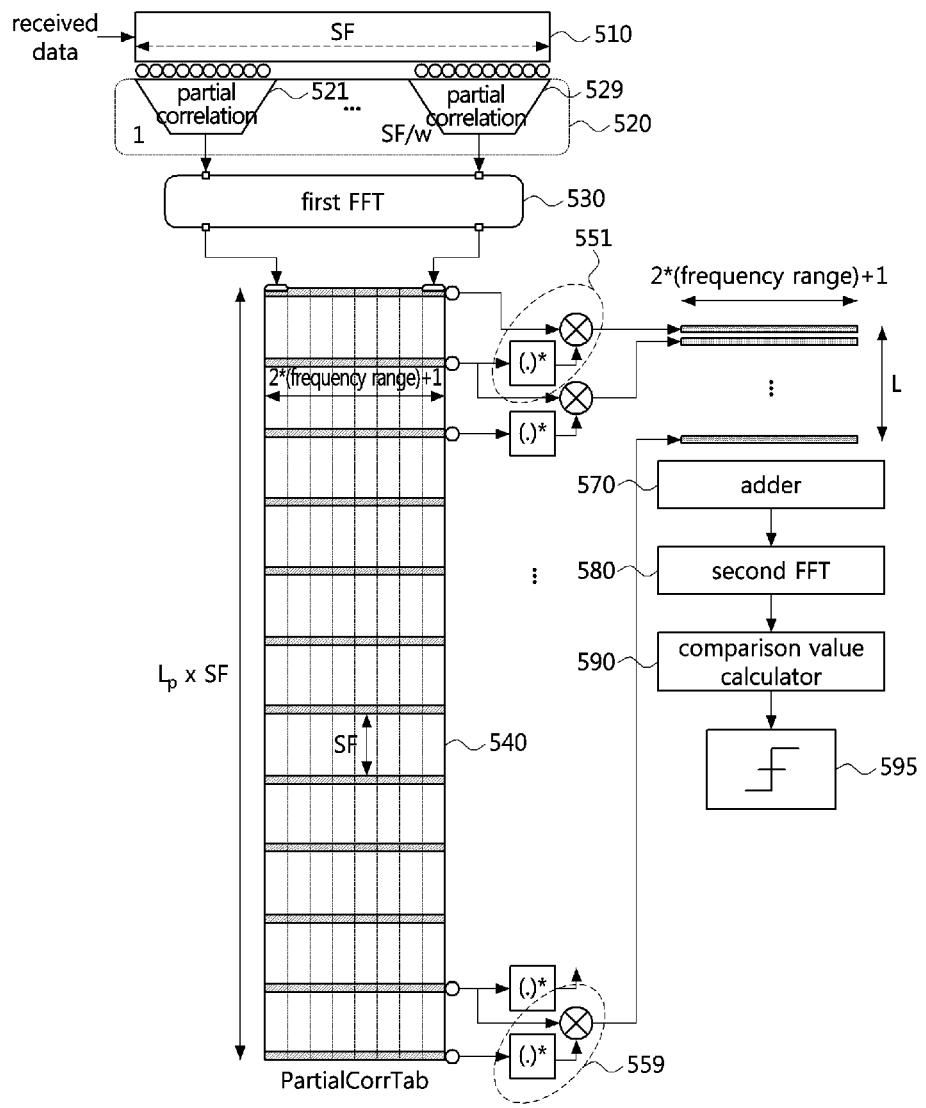
FIG. 5 is a structural diagram for describing an exemplary embodiment of a signal detector included in a receiver according to the present disclosure.

FIG. 5 is a structural diagram for describing an exemplary embodiment of a signal detector included in a receiver according to the present disclosure.

Referring to FIG. 5, a communication node of the communication system according to the present disclosure may include the receiver for receiving a wireless signal transmitted from another communication node. The receiver may include the signal detector performing a detection operation on the received wireless signal. Here, the receiver and the signal detector may be the same as or similar to the receiver 400 and the signal detector 410 described with reference to FIG. 4.

The signal detector may perform a data detection operation on the wireless signal received from another communication node. The received wireless signal may be the same as or similar to the wireless signal transmitted by the transmitter 300 described with reference to FIG. 3. The signal detector may synchronize with the transmitter that has transmitted the wireless signal based on the received wireless signal. The signal detector may identify a CFO or synchronization timing based on a portion corresponding to the SHR in the received wireless signal.

The signal detector may include a buffer 510, partial correlators 520, a first fast Fourier transform (FFT) unit 530, a cumulative product calculator 570, a second FFT unit 580, a comparison value calculator 590, a threshold value unit 595, and the like. Specific characteristics and operation methods of the respective components included in the signal detector will be described with reference to FIGS. 5 and 6 together.

Figure 6:
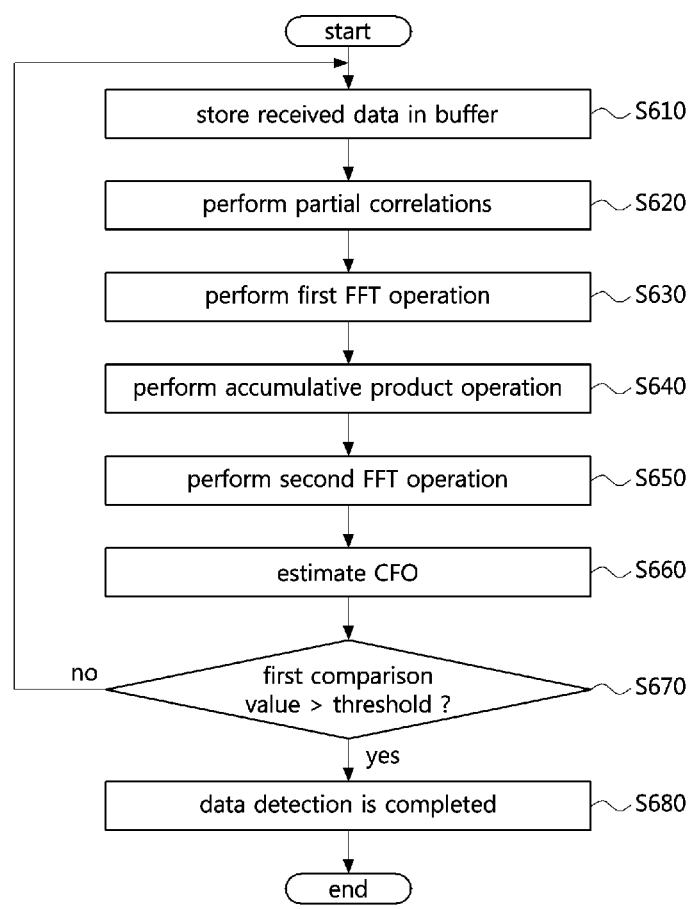
FIG. 6 is a flowchart for describing an exemplary embodiment of an operation method of a signal detector according to the present disclosure.

FIG. 6 is a flowchart for describing an exemplary embodiment of an operation method of a signal detector according to the present disclosure.

Referring to FIGS. 5 and 6, in an exemplary embodiment of the signal detector according to the present disclosure, the receiver included in the communication node may receive a wireless signal transmitted from the transmitter of another communication node. The buffer 510 included in the receiver may store the wireless signal received by the receiver as samples in the buffer (S610). Here, the length of the samples stored in the buffer 510 may be set to be longer than the length of the wireless signal transmitted by the transmitter. In an exemplary embodiment, the buffer 510 may store samples as long as twice the length of the wireless signal transmitted by the transmitter. When the size of the samples stored in the buffer 510 is too small, the wireless signal detection operation of the signal detector may not be smooth. On the other hand, when the size of the samples stored in the buffer 510 is too large, the efficiency of the receiver or communication system may be adversely affected. When the buffer 510 stores samples of the length corresponding to twice the length of the wireless signal transmitted by the transmitter, the excessive reduction of the efficiency of the receiver or communication system may be prevented while obtaining the effect of improving a signal detection success rate. To this end, the receiver may be informed of the length or size of the wireless signal transmitted by the transmitter in advance.

The buffer 510 may store a plurality of samples. For example, the buffer 510 may store samples as many as corresponding to the spreading factor (SF) applied to the first spreading encoder 325 or the second spreading encoder 345 of the transmitter 300 described with reference to FIG. 3. In order for the signal detector to perform a synchronization identification operation, it may be necessary to detect the SHR included in each wireless signal. When the length of the SHR initially intended to be transmitted together with the payload in the transmitter is $L_p$, the SHR that has undergone the spread coding operation in the second spreading encoder 345 may be spread to a size of $L_p \times SF$. The operations to be processed by the signal detector may be as many as $L_p \times SF$. That is, the operation may be repeated $L_p$ times in units of the SF. In this case, performing the FFT repeatedly $L_p$ times on data having the size of SF may be inefficient and high in complexity. On the other hand, in the present disclosure, rather than performing FFT on large-scale data, FFT may be performed on data whose size has been reduced through the partial correlators 520 in advance, thereby reducing the complexity of the FFT operation, and increasing the efficiency thereof.

The partial correlators 520 may perform partial correlations on the data stored in the buffer 510 (S620). To this end, the partial correlators 520 may include at least one or more partial correlators 521 to 529. Each of the partial correlators 521 to 529 may perform correlation on a signal as long as w. To this end, the receiver 500 of the communication system may include (SF/w) partial correlators 521 to 529. The partial correlators 520 including (SF/w) partial correlators 521 to 529 may output (SF/w) partial correlation operation results and transmit them to the first FFT unit 530. The first FFT unit 530 may perform a first FFT operation (S630). The FFT operation performed by the first FFT unit 530 may be partial FFT operations on the respective partial correlation operation results transmitted from the partial correlators 520.

As a result of the partial FFT operations, FFT result vectors may be output. The output FFT result vectors may be expressed as, for example, PartialCorrTab[SHR length][FFT length]. It can be seen that a FFT result for one received sample is first stored on the horizontal axis (one-dimensional), and is extended to the vertical axis (2-dimensional) by repeating it by the length of the SHR samples.

As the FFT result vectors (i.e., PartialCorrTab) output from the first FFT unit 530 are collected by the length of the SHR, one two-dimensional matrix may be configured. For example, a two-dimensional matrix PartialCorrTab[SHR length][FFT length] may be configured. A signal processing for finding a peak value may be performed in the range of the FFT results of PartialCorrTab [SHR length][FFT length] configured as described above. For example, in order to perform the signal processing for finding a peak value, data of PartialCorrTab[SHR length][peak candidate] may be temporarily transferred to a ptrFFTVector[n] vector.

An accumulated product operation may be performed on the generated temporary vectors ptrFFTVector[n] (S640). Equation 1 shows an exemplary embodiment of the cumulative product operation performed in the step S640.

$$AccuProd = \sum_{n=1}^{L_p} (ptrFFTVector[n] \times ptrFFTVector^*[n-1]) \quad \text{[Equation 1]}$$

Referring to Equation 1, for the cumulative product operation on the temporary vectors, a conjugate operation may be first performed on the (n−1)-th temporary vector (ptrFFTVector[n−1]), and the result thereof may be multiplied by the n-th temporary vector (ptrFFTVector[n−)1]). Such the operation may be performed from n=1 to n=$L_p$, so that all calculation results may be added. Such the operation may be performed by a plurality of multiplication circuits 551 to 559 and an adder 570 shown in FIG. 5 on an actual circuit.

Here, when the cumulative product operation is performed for the entire length of the first FFT, a large amount of computational resources may be consumed. Accordingly, the cumulative product operation may be performed only on some selected $L_p$ FFT results, not all of the results of the first FFT operation. For example, the cumulative product operation may be performed on FFT results with a high probability of generating a peak value among the first FFT results and on FFT results corresponding to a first searching range around the corresponding FFT results. As a result of the cumulative product operation, a range kProdMax having the largest cumulative value may be identified. The range kProdMax and some ranges around it may be configured as a second searching range. A second FFT operation may be performed on the second searching range (S650).

Here, the CFO may be estimated based on the results of the first FFT operation and the second FFT operation (S660). For example, the CFO may be estimated through an operation such as Equation 2.

$$\overline{CFO1} = \frac{k\_max}{1st\ FFT\ \text{size} \times \text{partial correlation length}} + \frac{i\_max}{2nd\ FFT\ \text{size} \times SF} \quad \text{[Equation 2]}$$

Referring to Equation 2, the CFO may be estimated based on the maximum value in the first FFT operation, the size of the first FFT, the length of the partial correlation, the maximum value in the second FFT operation, the size of the second FFT, and the SF.

Thereafter, it may be determined whether the wireless signal detection is successful (S670). Specifically, an average power Estlevel per preamble length in a range in which the power of the secondary FFT result is maximum may be calculated. A first comparison value may be calculated based on the average power Estlevel value in the range in which the power is maximum and an FFT result vector in the corresponding range. An operation on the first comparison value may be performed as in Equation 3.

$$\frac{|ptrFFTVector|}{EstLevel} = \text{first comprarion value} > \text{Threshold} \quad \text{[Equation 3]}$$

Referring to Equation 3, the first comparison value may be defined as a value obtained by dividing the magnitude of the FFT result vector in the range where the power of the FFT result is the maximum by the average power Estlevel in the range where the power of the FFT result is the maximum. Here, it may be identified whether the first comparison value is greater than a preset threshold (S670). If the first comparison value is greater than the preset threshold, the signal detector may determine that the wireless signal detection is successful (S680). If it is determined that the wireless signal detection is successful, the receiver may perform the CFO recovery and the subsequent payload restoration operations based on the previously estimated CFO.

On the other hand, if the first comparison value is smaller than the preset threshold, the signal detector may determine that the wireless signal detection has failed. That is, it may be determined that synchronization has failed based on the wireless signal collected in the buffer in the corresponding round, and the previous operations S610 to S680 described with reference to FIG. 6 may be performed again.

According to the exemplary embodiments of the present disclosure, the receiver included in the communication node of the communication system may effectively perform a wireless signal detection operation through prior partial correlation operations using a plurality of partial correlators, a first FFT operation, a cumulative product operation, a second FFT operation, and the like. In addition, according to the exemplary embodiments of the present disclosure, the receiver included in the communication node of the communication system may perform a wireless signal detection operation that is robust against interference between data that may occur in a situation where data transmitted from a plurality of communication nodes is simultaneously received, and has low complexity.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. A method for receiving a wireless signal, performed by a first communication node, the method comprising:
   storing the wireless signal received by the first communication node as samples in a buffer;
   performing partial correlation operations on the stored samples by a plurality of partial correlators;
   performing a first Fast Fourier Transform (FFT) operation on results of the partial correlation operations;
   performing a cumulative product operation on results of the first FFT operation;
   performing a second FFT operation based on a result of the cumulative product operation; and
   performing synchronization estimation based on the results of the first FFT operation and a result of the second FFT operation.

2. The method according to claim 1, wherein the performing of the cumulative product operation comprises:
   collecting the results of the first FFT operation by a first length; and
   generating a two-dimensional matrix based on the collected results of the first FFT operation.

3. The method according to claim 2, wherein the two-dimensional matrix has as many columns as a length of the first FFT operation and as many rows as a length of a synchronization header (SHR).

4. The method according to claim 1, wherein the performing of the cumulative product operation comprises:
   generating a plurality of temporary vectors based on a plurality of first FFT result vectors generated according to the first FFT operation;
   performing a conjugate operation on an (n−1)-th temporary vector among the plurality of temporary vectors;
   generating a product term by multiplying an n-th temporary vector among the plurality of temporary vectors and a result of the conjugation operation; and
   adding a plurality of the product terms,
   wherein n is a natural number.

5. The method according to claim 1, wherein the performing of the cumulative product operation comprises:
   configuring a first searching range based on the results of the first FFT operation; and
   performing the cumulative product operation on components corresponding to the first searching range among the results of the first FFT operation.

6. The method according to claim 1, wherein the performing of the second FFT operation comprises:
   identifying a range having a largest cumulative value as the result of the cumulative product operation;
   configuring a second searching range including a range having a largest accumulated value; and
   performing the second FFT operation on components corresponding to the second searching range.

7. The method according to claim 1, wherein the performing of the synchronization estimation comprises estimating a carrier frequency offset (CFO) based on a maximum value in the first FFT operation, a size of the first FFT operation, a length of the partial correlation operation, a maximum value in the second FFT operation, and a size of the second FFT operation.

8. A first communication node receiving a wireless signal in a communication system, the first communication node comprising:
   a processor;
   a plurality of partial correlators;
   a memory electronically communicating with the processor; and
   instructions stored in the memory,
   wherein when executed by the processor, the instructions cause the first communication node to:
   store the wireless signal received by the first communication node as samples in a buffer;

perform partial correlation operations on the stored samples by the plurality of partial correlators;

perform a first Fast Fourier Transform (FFT) operation on results of the partial correlation operations;

perform a cumulative product operation on results of the first FFT operation;

perform a second FFT operation based on a result of the cumulative product operation; and perform synchronization estimation based on the results of the first FFT operation and a result of the second FFT operation.

9. The first communication node according to claim 8, wherein the instructions further cause the first communication node to:

collect the results of the first FFT operation by a first length; and generate a two-dimensional matrix based on the collected results of the first FFT operation.

10. The first communication node according to claim 8, wherein the instructions further cause the first communication node to:

generate a plurality of temporary vectors based on a plurality of first FFT result vectors generated according to the first FFT operation;

perform a conjugate operation on an (n−1)-th temporary vector among the plurality of temporary vectors;

generate a product term by multiplying an n-th temporary vector among the plurality of temporary vectors and a result of the conjugation operation; and add a plurality of the product terms, wherein n is a natural number.

11. The first communication node according to claim 8, wherein the instructions further cause the first communication node to:

configure a first searching range based on the results of the first FFT operation; and perform the cumulative product operation on components corresponding to the first searching range among the results of the first FFT operation.

12. The first communication node according to claim 8, wherein the instructions further cause the first communication node to:

identify a range having a largest cumulative value as the result of the cumulative product operation;

configure a second searching range including a range having a largest accumulated value; and perform the second FFT operation on components corresponding to the second searching range.

13. The first communication node according to claim 8, wherein the instructions further cause the first communication node to estimate a carrier frequency offset (CFO) based on a maximum value in the first FFT operation, a size of the first FFT operation, a length of the partial correlation operation, a maximum value in the second FFT operation, and a size of the second FFT operation.

\* \* \* \* \*